United States Patent
Nicolas

(10) Patent No.: US 9,918,096 B2
(45) Date of Patent: Mar. 13, 2018

(54) METHOD FOR SELECTING A PIXEL POSITIONING SOLUTION TO OBTAIN AN OPTIMAL VISUAL RENDITION OF AN IMAGE

(71) Applicant: STMicroelectronics (Grenoble 2) SAS, Grenoble (FR)

(72) Inventor: Marina Nicolas, Voreppe (FR)

(73) Assignee: STMicroelectronics (Grenoble 2) SAS, Grenoble (FR)

( * ) Notice: Subject to any disclaimer, the term of this patent is extended or adjusted under 35 U.S.C. 154(b) by 4 days.

(21) Appl. No.: 14/877,761

(22) Filed: Oct. 7, 2015

(65) Prior Publication Data
US 2016/0249061 A1    Aug. 25, 2016

(30) Foreign Application Priority Data

Feb. 20, 2015 (FR) ..................................... 15 51460

(51) Int. Cl.
*H04N 19/154* (2014.01)
*H04N 19/46* (2014.01)
(Continued)

(52) U.S. Cl.
CPC ......... *H04N 19/186* (2014.11); *H04N 19/154* (2014.11); *H04N 19/176* (2014.11);
(Continued)

(58) Field of Classification Search
CPC .. H04N 19/154; H04N 19/176; H04N 19/186; H04N 19/187; H04N 19/46;
(Continued)

(56) References Cited

U.S. PATENT DOCUMENTS

2002/0031276 A1* 3/2002 Yagishita ................ G06T 9/004
                                                       382/252
2005/0031161 A1* 2/2005 Kondo ................... G06T 1/0028
                                                       382/232
(Continued)

FOREIGN PATENT DOCUMENTS

EP    1 389 771 A2    2/2004
EP    1 401 196 A1    3/2004
(Continued)

OTHER PUBLICATIONS

Chandler et al., "VSNR: A Wavelet-Based Visual Signal-to-Noise Ratio for Natural Images," *IEEE Transactions on Image Processing* 16(9):2284-2298, Sep. 2007.
(Continued)

*Primary Examiner* — Yubin Hung
(74) *Attorney, Agent, or Firm* — Seed IP Law Group LLP

(57) ABSTRACT

An image processing method, implemented in a calculator, includes applying a process by group of pixels to an original image. For each group of pixels, calculating a cumulative sum of value or position differences of the pixels of the group of pixels, and for each group of pixels, allocating in a final image signal a pixel position of the group of pixels to each pixel value of the group of pixels so as to minimize the cumulative sum of differences calculated for the group of pixels according to the differences calculated. For each group of pixels, determining a filtering intensity according to the cumulative sum of differences calculated for the group of pixels, and applying to the group of pixels a filtering having the filtering intensity.

18 Claims, 2 Drawing Sheets

(51) Int. Cl.
| | | |
|---|---|---|
| *H04N 19/86* | (2014.01) | |
| *H04N 19/88* | (2014.01) | |
| *H04N 19/186* | (2014.01) | |
| *H04N 19/176* | (2014.01) | |
| *H04N 19/593* | (2014.01) | |
| *H04N 19/82* | (2014.01) | |
| H04N 19/187 | (2014.01) | |

(52) U.S. Cl.
CPC ........... *H04N 19/46* (2014.11); *H04N 19/593* (2014.11); *H04N 19/82* (2014.11); *H04N 19/86* (2014.11); *H04N 19/88* (2014.11); *H04N 19/187* (2014.11)

(58) Field of Classification Search
CPC ...... H04N 19/593; H04N 19/82; H04N 19/86; H04N 19/88
See application file for complete search history.

(56) References Cited

U.S. PATENT DOCUMENTS

| | | | | |
|---|---|---|---|---|
| 2006/0182350 | A1* | 8/2006 | Kondo | H04N 19/98 382/232 |
| 2007/0133889 | A1* | 6/2007 | Horie | H04N 19/176 382/232 |
| 2011/0026820 | A1* | 2/2011 | Strom | G06T 9/00 382/166 |
| 2012/0177298 | A1* | 7/2012 | Fujino | H04N 1/41 382/232 |
| 2013/0315493 | A1* | 11/2013 | Sato | G06T 9/007 382/232 |

FOREIGN PATENT DOCUMENTS

| | | |
|---|---|---|
| WO | 2007/036055 A1 | 4/2007 |
| WO | 2014118148 A1 | 8/2014 |

OTHER PUBLICATIONS

Hong et al., "Multi-Scale Hybrid Linear Models for Lossy Image Representation," *IEEE Transactions on Image Processing*, 2006, 19 pages.

Hua et al., "Inertia: a New Force Field for Geometric Active Contour," American Control Conference, Seattle, WA, Jun. 11-13, 2008, 6 pages.

Lebowsky, "Optimizing color fidelity for display devices using contour phase predictive coding for text, graphics, and video content," Proc. SPIE 8652, 86520X, 2013, 9 pages.

Lebowsky et al., "Color discrimination problems in digital TV systems," Proc. SPIE 5667, 374, 2005, 11 pages.

Lebowsky et al., "Perceptual image quality improvement for large screen displays," Proc. SPIE 6057, 60570L, 2006, 10 pages.

Lebowsky et al., "Optimizing color edge contrast in presence of noise and amplitude quantization errors," Proc. SPIE 6493, 64930B, 2007, 11 pages.

Ng et al., "Surface-From-Gradients Without Discrete Integrability Enforcement: a Gaussian Kernel Approach," *IEEE Transactions on Pattern Analysis and Machine Intelligence* 32(11), 2010, 15 pages.

Rouse et al., "Analyzing the Role of Visual Structure in the Recognition of Natural Image Content with Multi-Scale SSIM," Presented at SPIE Human Vision and Electronic Imaging XIII, San Jose, CA, 2008, 14 pages.

Said et al., "A New, Fast, and Efficient Image Codec Based on Set Partitioning in Hierarchical Trees," *IEEE Transactions on Circuits and Systems for Video Technology* 6(3):243-250, Jun. 1996.

SIPI Image Database, "vol. 1: Textures," retrieved on Aug. 27, 2015 from http://sipi.usc.edu/database/database.php?volume=textures, 2 pages.

Somkantha et al., "Boundary Detection in Medical Images Using Edge Following Algorithm Based on Intensity Gradient and Texture Gradient Features," *IEEE Transactions on Biomedical Engineering* 58(3):567-573, Mar. 2011.

Tasdizen, "Principal Neighborhood Dictionaries for Nonlocal Means Image Denoising," *IEEE Transactions on Image Processing* 18(12):2649-2660, Dec. 2009.

Wang et al., "Image Quality Assessment: From Error Visibility to Structural Similarity," *IEEE Transactions on Image Processing* 13(4), Apr. 2004, 14 pages.

Wolfram Language & System Documentation Center, "JPEG," retrieved on Aug. 27, 2015 from http://reference.wolfram.com/language/ref/format/JPEG.html, 3 pages.

Lebowsky et al., "Preserving color fidelity for display devices using scalable memory compression architecture for text, graphics, and video", *Proceedings of SPIE—IS&T Electronic Imaging 9015*, Jan. 8, 2014, 12 pages.

\* cited by examiner

METHOD FOR SELECTING A PIXEL POSITIONING SOLUTION TO OBTAIN AN OPTIMAL VISUAL RENDITION OF AN IMAGE

BACKGROUND

Technical Field

The present disclosure relates to digital image processing algorithms, and more particularly, to image compression algorithms.

Description of the Related Art

Generally, an image to be displayed on a screen, for example a TV screen, is represented by digital data organized in a matrix structure representing a grid of pixels, each pixel being defined by a luminance component or several color components, for example luminance Y and chrominance Cr and Cb components. Each component is defined by a level or an amplitude for the pixel considered. Such a pixel structure, commonly referred to as "bitmap", thus corresponds pixel by pixel to the image (then referred to as raster image or raster) which must be displayed on a screen. Generally, the pixel structure is stored in the same format as the one used for storage in the video memory of the screen. The raster thus stored in the video memory is read pixel by pixel on a line and line by line. This is referred to as a "raster scan".

Currently, rasters used for so-called "HDTV" have a so-called "2k1k" size, i.e., 1,920 pixels per line on 1,080 lines. The frequency of raster display is generally 60 rasters per second. To send such an image signal, supplied by a TV decoder, on a hard-wire connection linking the decoder to the TV, it is necessary to perform a compression of the image signal sent by the decoder. Indeed, transmitting such an image signal without compression requires extremely high transfer speeds that are generally expensive and create electromagnetic interferences.

This is why the image signal supplied by the decoder is compressed. Currently, a conventional compression of such a signal can be carried out by applying a two-dimensional low-pass filter to the chrominance components of the image signal. However, even though the quality of the image ultimately displayed on the screen remains acceptable, high frequency information of the image signal may be lost. Furthermore, when such a compression is applied to an image raster having a so-called "4k2k" size, i.e., 3,840 pixels per line on 2,160 lines, the video part of the image remains acceptable, with the above-mentioned disadvantages, but the graphics and colored texts are degraded (blurred colors and decrease in contrasts). Applying such a compression on an even greater raster size, for example "8k4k", becomes even more problematic.

BRIEF SUMMARY

The applicant thus proposed a method for compressing images (see WO 2014/118148), called "parametric functional compression" or PFC, offering the advantage of limiting the visible deteriorations susceptible of appearing in decompressed images. This compression method comprises:

for each color component of the image pixels, subdividing the image of pixels into blocks of several neighboring pixels, for each block, forming an ordered group of pixel values according to the value of their color component, and the approximation of the color component of the pixels of each ordered block by a function of monotonic approximation to a variable related to the ranks of the ordered pixels in the ordered group, the compressed image signal comprising, for each color component and for each block of pixels of the image, position information corresponding to the ordered pixel values in the block and characteristics of the approximation function associated with this block.

To reduce the number of bits necessary to code the position of the pixels in each block, provision may be made for dividing each block into groups of pixels according to a particular distribution in the block, for example in the form of a checkerboard; the positions of the pixels associated with the ordered values are then determined in each group.

For example, if blocks of 4×4 pixels divided into two groups of 8 pixels are considered, the coding of the positions of the pixels associated with the ordered values in each group requires at least 16 bits. A full block then requires 32 bits to which one or more bits for coding the form of distribution of the pixels in each group are added. Several forms of distribution can be used to compress a same image.

Furthermore, the standards for coding or compressing images such as JPEG, MPEG, H264 and HEVC require, upon encoding, the implementation of predictive loops to optimize the efficiency of compression. These predictive loops apply criteria for minimizing errors such as SAD (Sum of Absolute Difference) or MSE (Mean Square Error). It transpires that these criteria can lead to several solutions that are mathematically equivalent. However, it can be seen that these mathematically equivalent solutions are not generally equivalent from a visual point of view, and do not prevent the appearance in the decoded images of isolated pixels or visual artifacts, such as blockiness, pixelization or echo effects.

It may be desirable to propose a method for positioning pixels in the framework of the PFC compression method or of a method for correcting the pixels in an image signal, which takes into account the human visual system. For this purpose, it may be desirable to propose a criterion for selecting a solution for positioning or correcting the pixels of a group of pixels in an image among several mathematically equivalent solutions, which takes into account the human visual system. It may further be desirable to propose a criterion for simplifying the calculations used in image processing operations, while preserving the visual quality of the processed image.

It may further be desirable to reduce the number of bits used to code the position of the pixels of an image in a compressed image signal, generated by a system requiring the transmission of these positions, such as a PFC compression system, to increase the compression rate of the image.

Some embodiments relate to an image processing method, implemented in a calculator, the method comprising steps of: applying a process by group of pixels to an original image to obtain a final image signal, for each group of pixels, calculating a cumulative sum of value or position differences of the pixels of the group of pixels, for each group of pixels, allocating in the final image signal a pixel position of the group of pixels to each pixel value of the group of pixels, so as to minimize the cumulative sum of differences calculated for the group of pixels, and/or for each group of pixels, determining a filtering intensity according to the cumulative sum of differences calculated for the group of pixels, and applying to the group of pixels a filtering having the filtering intensity.

According to one embodiment, the calculation of the cumulative sum of differences for one of the groups of pixels of the image comprises steps of: defining an interval for each pixel position of the group of pixels of the final image, based on values of pixels neighboring the pixel position in the final image, and for each pixel value of the group of pixels, and for each interval defined for a position of the group of pixels, calculating a difference between the pixel value and the interval.

According to one embodiment, each interval is defined for a pixel position of the group of pixels of the final image according to an interval defined at a corresponding position in the original image based on the values in the original image of the pixels neighboring the pixel position.

According to one embodiment, each interval is defined for a pixel position in the final image, either between the lowest value and the highest value, among the values in the final image of the pixels neighboring the pixel position, if the value in the original image of the pixel at the pixel position, is between the lowest value and the highest value, among the values in the original image of the pixels neighboring the pixel position, or between a minimum value and the lowest value among the values in the final image of the pixels neighboring the pixel position, if the value in the original image of the pixel at the pixel position is lower than the lowest value among the values in the original image of the pixels neighboring the pixel position, or between the highest value among the values in the final image of the pixels neighboring the pixel position and a maximum value, if the value in the original image of the pixel at the pixel position is higher than the highest value among the values in the original image of the pixels neighboring the pixel position.

According to one embodiment, each interval is defined for a pixel position in the final image, between a lower limit chosen equal to the value of a first neighboring pixel among the values of the neighboring pixels, and an upper limit chosen equal to the value of a second neighboring pixel, the position of the first neighboring pixel being the position of the highest value among the values of the neighboring pixels in the original image, lower than the value of the pixel in the original image, the position of the second neighboring pixel being the position of the lowest value among the values of the neighboring pixels in the original image higher than the value of the pixel in the original image.

According to one embodiment, the image comprises several layers, the neighboring pixels used to determine the interval of a pixel position belonging to a layer adjoining the layer in which the pixel position is situated.

According to one embodiment, the allocation in the final image signal of a position to each pixel value of the group of pixels, comprises steps of: for each pixel value of the group of pixels and each pixel position of the group of pixels, calculating a probability of the pixel value being at the pixel position, according to the difference between the pixel value and the interval defined for the pixel position, and allocating in the final image signal the pixel values to the pixel positions of the group of pixels according to the probabilities calculated, so as to maximize a cumulative sum of the probabilities associated with the allocations of pixel values to the pixel positions performed.

According to one embodiment, the allocation in the final image signal of a position to each pixel value of the group of pixels, comprises steps of: selecting the pixel position and the pixel value corresponding to the highest probability among the probabilities calculated, and allocating the selected pixel value to the pixel position selected in the final image signal, and executing the selection step for each pixel position or pixel value still to be allocated.

According to one embodiment, the allocation in the final image signal of a position to each pixel value of the group of pixels comprises steps of: for each pixel of the group of pixels, calculating a cumulative sum of all the probabilities calculated for the pixel, for each position of the group of positions, calculating a cumulative sum of all the probabilities calculated for the position, selecting the pixel position or the pixel value corresponding to the lowest cumulative sum of probability, and allocating the pixel value corresponding to the highest probability calculated for the selected pixel position, to the selected pixel position, or allocating the pixel position corresponding to the highest probability calculated for the selected pixel value, to the selected pixel value, and executing the selection step for each pixel position or pixel value still to be allocated.

According to one embodiment, the image is cut into blocks of pixels, and each block is divided into two groups of pixels, such that each pair of two adjacent pixels of the block comprises one pixel of each group, only the positions of the pixels of only one of the two groups being included in the final image signal, and the pixel values being allocated to the positions of the group of pixels the pixel positions of which are not included in the image signal.

According to one embodiment, the method comprises a step of selecting a first of the two groups of pixels for which the pixel positions are included in the final image signal, so as to minimize a number of errors generated, the allocation in the final image signal of a position to each pixel value being performed on a second of the two groups of pixels.

According to one embodiment, the calculation of the cumulative sum of differences for one of the groups of pixels of the image comprises steps of calculating a difference between a rank of each pixel of the group of pixels in the final image and a rank of a corresponding pixel in the original image, for each positioning solution of a set of several positioning solutions for positioning the pixels of the group of pixels in the final image.

According to one embodiment, the allocation in the final image signal of a position to each pixel value of the group of pixels comprises steps of: calculating for hypotheses of allocation of the positions of the group of pixels to the pixels of the group of pixels, a cumulative sum of the differences calculated according to the hypothesis, and selecting the hypothesis corresponding to the lowest cumulative sum.

Some embodiments also relate to an image processing device, configured to execute the method as previously defined.

BRIEF DESCRIPTION OF THE SEVERAL VIEWS OF THE DRAWINGS

Some examples of embodiments of the present disclosure will be described below in relation with, but not limited to, the accompanying figures, in which.

DETAILED DESCRIPTION

Figure 1:
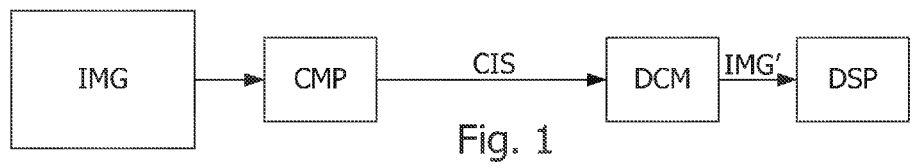
FIG. 1 schematically represents a system for compressing and decompressing images, FIG. 2 schematically represents an image the pixels of which are distributed in blocks, FIG. 3 schematically represents a block of pixels of an image.

FIG. 1 represents a system for compressing and decompressing images. This system comprises a compression device CMP for compressing an image signal IMG comprising a sequence of pixels. Each pixel of the image signal IMG may comprise one or more components. If it is a black and white image, each pixel is defined by a single intensity component. If it is a color image, each pixel is defined by three amplitude components, such as red R, green G and blue B for an image signal RGB, or luminance Y and chrominance Cb and Cr for an image signal YCbCr. The compression device CMP is configured to provide for each component a compressed image signal CIS.

The signal CIS may be provided to a decompression device DCM, for example to then be displayed on a screen DSP. The device DCM is configured to reconstitute each component of the pixels of an image IMG' from the compressed image signal CIS.

Figure 2:
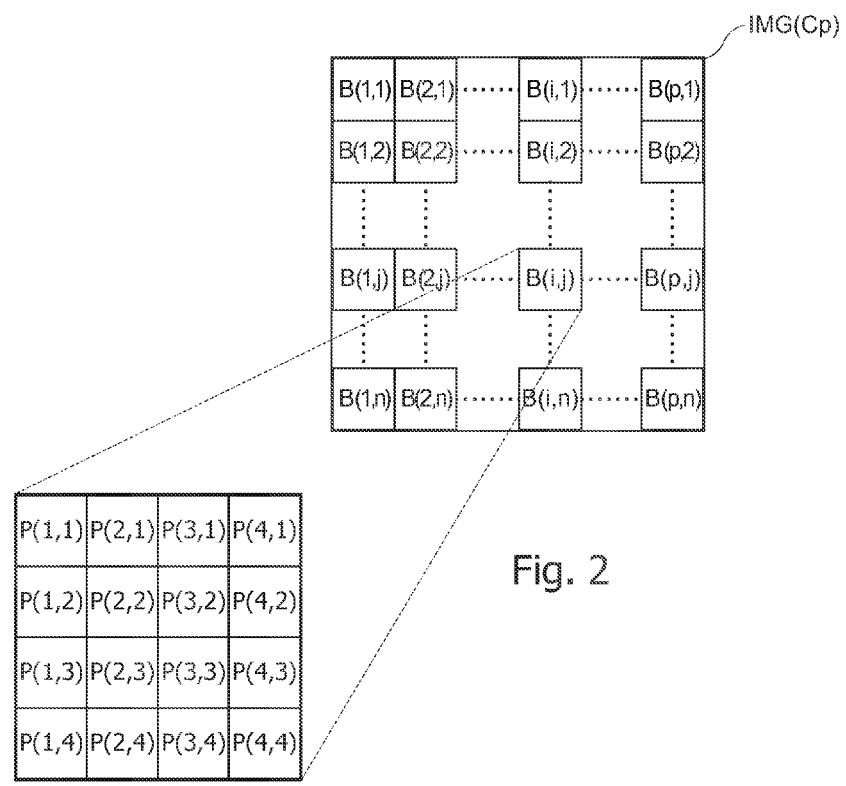

The compression device CMP generally processes each component of the image signal IMG separately, either in parallel, or sequentially. FIG. 2 represents the components Cp of the pixels of the image IMG. The pixels of the image IMG are distributed in blocks B(i,j) of image data comprising pixels of several consecutive lines and of several consecutive columns of the image IMG. Thus, in the example of FIG. 2, the blocks B(i,j) comprise 4×4 pixels. Each component value of each pixel may for example be coded on a number of bits ranging between 8 and 16 bits.

Figures 3, 4:
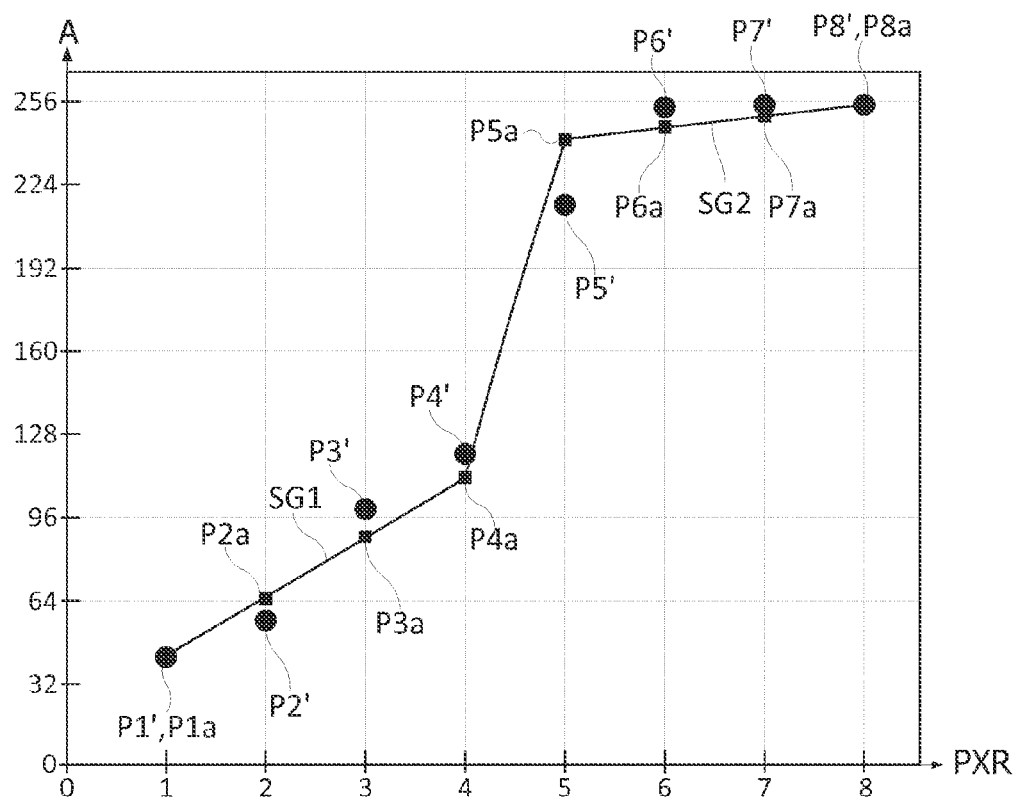
FIG. 4 represents on a graph pixel values from a group, ordered by increasing amplitude and the curve of a function for approximating the values of these pixels.

In the case of the PFC compression method, each block B(i,j) for each component is divided into two groups of pixel values. FIG. 3 represents a block B(j,j) comprising a first group containing pixel values V1 to V8 and a second group containing pixel values P1 to P8. In the example of FIG. 3, the two groups have the configuration of a checkerboard. It will be understood that other configurations may be considered. For example each group may contain two full lines or two full columns, interleaving with the lines or the columns belonging to the other group.

For each pixel component, the pixel values in each group are ordered according to their amplitude or value, for example by increasing amplitude. For greater clarity, the term (pixel) "value" used below means the amplitude of a component of a pixel. The original rank of each pixel in each group is stored to enable the position of the pixel in the compressed image to be determined from parameters of an interpolation function. Thus, the position of each pixel Vj, Pj in the image can be determined by the correspondence between its rank in the ordered group to which it belongs, and its original rank in its group before the latter is ordered by increasing value, and by the configuration of the distribution of the pixels into two groups in the block B(i,j). The values of the pixels thus ordered are then approximated by a monotonic function giving an approximate value of the value of each pixel according to the ordered rank of the pixel.

FIG. 4 represents, on a graph, the values P1' to P8' of a group for a component, according to their rank PXR in the ordered group, the values P1' to P8' resulting from an ordering by increasing value, for example of the values P1 to P8 of FIG. 3. FIG. 4 also represents two segments SG1, SG2 defining an interpolation function for interpolating the value of the pixels. The segment SG1 provides an approximate value P1a-P4a for each of the values P1' to P4' and the segment SG2 provides an approximate value P5a-P8a for each of the values P5' to P8'. The slope of each of the segments SG1, SG2 is calculated so as to minimize the differences between each amplitude value P1' to P8' in the original image and the corresponding approximate value P1a to P8a. The criteria for minimizing these differences can implement a difference calculation function of SAD (Sum of Absolute Differences) or MSE (Mean Square Error) type. The values of the pixels V1-V8 are also ordered by increasing value to obtain a group V1' to V8' of ordered values. The values V1' à V8' are then approximated by two segments. These approximated values are noted V1a to V8a.

In the example of the block B(i,j) of FIG. 3, the slopes of the segments SG1 and SG2 thus obtained for each of the ordered groups P1' to P8' and V1' to V8' resulting from the ordering of the groups P1 to P8 and V1 to V8, are quantified for example on 8 bits. The values of the pixels of each group are thus defined in the compressed image signal CIS by data defining the slope of each segment SG1, SG2, as well as a point of each of these segments, for example the final or initial point of the segment. The respective original ranks of the pixels P1a to P8a and V1a to V8a in each of the two ordered groups are sent in the compressed image signal CIS.

It transpires that the criteria for minimizing the differences to determine the slopes of the segments SG1 and SG2 can result in several mathematically equivalent but visually different solutions. It may also happen that two pixels of the same value or having similar values for a component in the original image are allocated to two different values by the decompression process using the interpolation function. Thus in the example of FIG. 4, the pixels P6' and P7' have identical or similar values in the original image and different compressed values P6a, P7a on the segment SG2. Upon decompression, the allocation of the compressed values P6a, P7a to the pixels P6' and P7' can result in artifacts visible in the final decompressed image.

According to one embodiment, the positions of two pixels of the original image may be reversed in the compressed image, when these two pixels have identical or similar amplitude values in the original image. To determine whether a position reversal must be applied to two pixels of the compressed image, an interval in which the compressed value of the pixel must be is defined for each of the two pixel positions. This interval can be defined according to the value of this pixel (for example P4) in the original image, and according to the values of the pixels in the final image, near the pixel position considered, in the following manner:

if the value of the pixel considered, for example P4, in the original image is situated between the minimum and maximum values of the neighboring pixels V2, V3, V4, V6 in the original image, the interval to be taken into account is defined by the minimum and maximum values of the neighboring pixels V2, V3, V4, V6, if the value of the pixel (P4) in the original image is higher than the maximum value of the neighboring pixels (V2, V3, V4, V6) in the original image, the interval to be taken into account is defined by the maximum value of the neighboring pixels and the maximum possible value, i.e., the maximum value of the neighboring pixels V2, V3, V4, V6 in the example of FIG. 4, and 255 (if the pixel values are represented by non-signed integers coded on 8 bits), and if the value of the pixel (P4) in the original image is lower than the minimum value of the neighboring pixels (V2, V3, V4, V6) in the original image, the interval to be taken into account is defined by the minimum possible value and the minimum value of the neighboring pixels (V2, V3, V4, V6), i.e., 0 (if the pixel values are represented by non-signed integers coded on 8 bits) and the minimum value of the neighboring pixels V2, V3, V4, V6 in the example of FIG. 4.

This interval defined in the original image is matched to an interval in the decompressed image defined in the following manner, for example for P4:

if the interval in the original image is defined by the minimum and maximum values of the neighboring pixels V2, V3, V4, V6, then the corresponding interval in the decompressed image is defined by the minimum and maximum values of the post-decompression values associated with the positions of the neighboring pixels V2, V3, V4, V6, if the interval in the original image is defined by the maximum value of the neighboring pixels and the maximum possible value, then the corresponding interval in the decompressed image is defined by the maximum value of the post-decompression pixel values associated with the positions of the neighboring pixels V2, V3, V4, V6 and the maximum possible value, and if the interval in the original image is defined by the minimum possible value and the minimum value of the neighboring pixels, then the corresponding interval in the decompressed image is defined by the minimum possible value and the minimum value of the post-decompression values associated with the positions of the neighboring pixels V2, V3, V4, V6.

The pixels neighboring a pixel position may comprise all or part of the 8 pixels surrounding the pixel position (for example for the pixel position P4, the pixels P1, V2, P2, V3, V4, P5, V6, P6. It shall also be noted that the minimum and maximum values of the interval in the original image to be taken into account for a pixel position can be defined by selecting, among the values of the neighboring pixels, the lower value and the upper value closest to the value of the pixel at the position considered in the original image, rather than by using the minimum and maximum values of the pixels neighboring the pixel position considered. The corresponding interval in the decompressed image is then defined by the values in the decompressed image of the two neighboring pixels the position of which corresponds in the original image to the two neighboring positions determining the limits of the interval in the original image.

In the event that two identical or similar values in the original image correspond to different decompressed values, the encoder performing the compression makes a prediction of the fidelity obtained upon decompression by applying the following method. A difference is calculated between each of the two decompressed pixel values with the interval defined in the decompressed image for each of the two pixels at the positions that would be allocated to each one, in the event that the positioning of the two pixels in the decompressed image is done according to the ranks allocated by the default ordering of the original values. "Default ordering" here means the ordering performed between two equal or similar original values, and which arbitrarily designates which of these two values is considered the lowest and which of these two values is considered the highest. This difference is zero if the decompressed pixel value belongs to the interval considered, and equal to the difference between the value of the pixel and the minimum or maximum value of the interval, depending on whether the value of the pixel is lower or higher than the interval considered.

In the same way, a difference is defined between each of the two decompressed pixel values with the interval defined in the decompressed image for each of the two pixels at the previous reversed positions. A first sum of the differences calculated for the two pixels when the two pixels are at the positions which would result from the default rearrangement, and a second sum of the differences calculated for the two pixel values when the positions of the two pixels are reversed are then calculated. The positions of the two pixels are reversed in the compressed image signal CIS when the second sum is lower than the first sum. This possible reversal is done by the encoder by sending the reversed rank information in the compressed signal. This reversal is thus transparent for the decoder.

This method is applied for each of the components of the image. This method can also be applied to three pixels having identical or similar values in the original image. In this case, six solutions are possible (=3!) for the positioning of the three pixels. The solution chosen is the one for which the sum of the differences is the lowest.

According to another embodiment, the image compression rate is increased by sending in the compressed image signal, only some of the positions of the ordered pixel values in each block. The positions missing from the image signal are determined by a probability calculation according to the values of the neighboring pixels in the decompressed image. Intuitively, there is a high probability that the value of a pixel to be positioned is located in an interval [IMn(l), IMx(l)] defined by the minimum IMn(l) and maximum IMx(l) values of the values of the pixels neighboring a pixel position Pl to be allocated, or is located close to this interval. However, the pixels having a value far away from this interval appear isolated and could be seen as noise. This amounts to defining the interval in the decompressed image without having the reference of an interval defined based on the original image, as it is not available. Indeed, it can be considered that the original interval as previously defined corresponds in most cases to the interval defined by the minimum and maximum values of the neighboring pixels in the original image.

In the example of configuration of the groups of FIG. 3, only the positions of the ordered values V1' to V8' corresponding to the pixel values V1 to V8 are coded in the compressed image signal, whereas the respective positions of the values ordered P1' to P8' are determined according to values of the pixels V1 to V8. For this purpose, it is considered that there is a high probability that a pixel value is at a certain pixel position, for example the position P4, if its value is in an interval [IMn(4), IMx(4)] defined by the minimum and maximum values of the pixels V2, V3, V4, V6 neighboring the position P4. For the pixel positions neighboring the edges of the block B(i,j), this interval can be defined if possible by using the values of the neighboring pixels located in the blocks adjacent to the block B(i,j). Thus, the values of the pixels neighboring the position P3 considered to define this interval may be those of the pixels V1, V3 and V5 of the block B(i,j) and the one of the pixel V4 of the block B(i−1,j). If the values of the pixels of the adjacent blocks are not available, this interval can be defined by only taking account of the values of the pixels neighboring the block B(i,j), thus only the values of the pixels V1, V3 and V5 for the pixel P3.

In the event that the image is made up of several superimposed layers, the neighboring pixels to be taken into account to determine the interval associated with a pixel position may also comprise the pixel opposite the pixel position considered in each adjacent image layer, or all or part of the set comprising the opposite pixel and the eight pixels surrounding this pixel in the adjacent layer.

To determine the position of the eight pixel values of a block B(i,j) not associated with a position in the compressed image signal CIS, a matrix of 8×8 values ln(k,l) is considered, with the indexes k and l possibly taking all the values between 1 and 8, such that:

ln(k,l)=1 if the pixel value Ck is in the interval [IMn(l), IMx(l)] defined by the values of the pixels neighboring the position Pl in the image, and ln(k,l)=0 otherwise.

The number of candidate pixel values for the position Pl in the block B(i,j) can therefore be calculated in the following manner:

$$NCL(l) = \Sigma_{k=1}^{8} \ln(k,l) \quad (1)$$

A matrix Ppos of 8×8 coefficients Ppos(k,l) each equal to an estimation of the probability of the pixel of value Ck being at the position Pl is also considered. The coefficients Ppos(k,l) of the matrix Ppos can be determined in the following manner:

$$Ppos(k,l) = FL(NCL(l))/NCL(l) \quad (2)$$

when the value Ck is in the interval [IMn(l), IMx(l)] defined by the values of the pixels neighboring the position Pl, FL(l) being an increasing function between 0 and 1 on the interval [0, 8] with FL(0)=0, FL(8)=1. For example, the function FL has the values defined by the following Table I:

TABLE I

| | | | | I | | | | | |
|---|---|---|---|---|---|---|---|---|---|
| | 0 | 1 | 2 | 3 | 4 | 5 | 6 | 7 | 8 |
| FL(I) | 0 | 86/240 | 132/240 | 165/240 | 192/240 | 210/240 | 222/240 | 238/240 | 1 |

It can be seen in the equation (2) that the coefficients Ppos(k,l) decrease when the number NCL(l) of candidate pixel values Ck for the position Pl increases. This means that the higher the number of candidate pixel values belonging to the interval [IMn(l), IMx(l)] of a position Pl to be allocated, the lower the probability of one of these pixel values Ck being at this position P1.

Statistics developed from images representing natural contents have established that there is no particular reason to favor a value among those belonging to the interval [IMn(l), IMx(l)], whether it be one of the values of the interval corresponding to the value of one of the neighboring pixels or a value close to the middle of the interval for example. However, on particular images, like text images, it may be relevant to favor at a position Pl candidate pixel values close to one of the values of the pixels neighboring this position.

In the event that NCL(l)=8, the coefficient Ppos(k,l) is defined by the equation (2) for any index k. However, in the case where NCL(l)<8, the probability (1−FL(NCL(l))) must still be distributed between the values Ck not belonging to the interval [IMn(l), IMx(l)]. It is then desirable to distribute a probability to the other values Ck not belonging to the interval [IMn(l), IMx(l)] of a position Pl to be allocated, by favoring the pixels having a value Ck close to the interval [IMn(l), IMx(l)] defined by the values of the pixels neighboring this position P1. For this purpose, for each candidate pixel value Ck outside the interval [IMn(l), IMx(l)] of each position Pl to be allocated, a difference Dist(k,l) is calculated between the value Ck and the limit IMn(l), IMx(l) of the closest interval:

$$Dist(k,l) = Ck - IMx(l) \text{ if } Ck > IMx(l), \quad (3)$$

$$Dist(k,l) = IMn(l) - Ck \text{ if } Ck < IMn(l), \text{ and} \quad (4)$$

$$Dist(k,l) = 0 \text{ if } IMnl(l) \leq Ck \leq IMx(l). \quad (5)$$

To perform a standardization of the differences, the sum of all the differences calculated for a position Pl, is also calculated as follows:

$$TDisL(l) = \Sigma_{k=1}^{8} (1 - \ln(k,l)) \cdot Dist(k,l) \quad (6)$$

The coefficients Ppos(k,l) of the matrix Ppos for the values Ck not in the interval defined by the pixels neighboring the position Pl, can be calculated in the following manner:
if NCL(l)=7:

$$Ppos(k,l) = 1 - FL(NCL(l)), \text{ and} \quad (7)$$

if NCL(l)<7:

$$Ppos(k,l) = [1 - FL(NCL(l))] - [TDisL(l) - Dist(k,l)]/[7 - NCL(l)] \quad (8)$$

The coefficients thus calculated of the matrix Ppos show that several positions can be considered as also desirable from a visual point of view for a candidate pixel value Ck, i.e., have identical maximum coefficients Ppos(k,l). However a single position Pl must be chosen for each candidate pixel value Ck. For this purpose, another matrix Prnk is defined, such that each of its coefficients Prnk(k,l) represents an estimation of the probability that a candidate pixel value Ck is at the position P1. The elements of the matrix Prnk are calculated in a manner similar to those of the matrix Ppos, by considering that a candidate pixel value Ck is more likely to be at the position Pl if it is in the interval of values [IMn(l), IMx(l)] defined by the values of the pixels neighboring the position P1.

The number NCK(l) of positions Pl in the block B(i,j) where the value Ck is in the interval [IMn(l), IMx(l)] defined by the pixels neighboring the position Pl is calculated in the following manner:

$$NCK(k) = \Sigma_{l=1}^{8} \ln(k,l) \quad (9)$$

The coefficients Prnk(k,l) of the matrix Prnk(k,l) can be determined in the following manner:

$$Prnk(k,l) = FL(NCK(k))/NCK(k), \quad (10)$$

when the value Ck is in the interval defined by the values of the pixels neighboring the position P1.

For the coefficients Prnk(k,l) of the matrix Prnk corresponding to the values Ck not in the interval defined by the values of the pixels neighboring the position Pl, the following sum of differences is calculated:

The coefficients Prnk(k,l) of the matrix Prnk for the values Ck not in the interval [IMn(l), IMx(l)] defined by the values of the pixels neighboring the position Pl, can be calculated in the following manner:
if NCK(k)=7:

$$Prnk(k,l) = 1 - FL(NCK(k)), \text{ and} \quad (12)$$

if NCK(k)<7:

$$Prnk(k,l) = [1 - FL(NCK(k))] - [TdisK(k) - Dist(k,l)]/[7 - NCK(k)] \quad (13)$$

The coefficients Prnk(k,l) thus calculated of the matrix Prnk also show that several pixel values Ck can also be desirable for a pixel position Pl, i.e., have identical maximum coefficients Prnk(k,l). According to one embodiment, the coefficients of the matrix Prnk(k,l) are modulated to take into account the fact that the minimum and maximum values of the values Ck are statistically more often situated in the corners than toward the middle of the blocks B(i,j). This is due to the continuous nature of the spatial gradient of the images representing natural contents.

According to one embodiment, a probability matrix Prb is determined by multiplying the coefficients of the matrices Ppos and Prnk in pairs:

$$Prb(k,l)=Ppos(k,l)-Prnk(k,l) \quad (14)$$

The probability matrix Prb as built by the method described previously includes the information required to position the pixels sent without any position information, taking into account the values of the neighboring pixels sent with their position in the block B(i,j), and, where applicable, in the neighboring blocks. Different strategies can be implemented to position the pixels sent without any position information, by using the probability matrix Prb. The first strategy involves positioning first in the block B(i,j) the pixel corresponding to the highest probability in the matrix Prb, and so on and so forth, on the understanding that each coefficient Prb(k,l) of the matrix Prb corresponds to a pixel to be positioned and a position in the block B(i,j). Thus, the positioning of the eight pixels of a group can be carried out in eight iterations, each iteration consisting of selecting the pair (pixel value Ck, position Pl) corresponding to the highest coefficient Prb(k,l) remaining in the matrix Prb, and of erasing in the matrix Prb the entire line and column in which the highest selected value is situated. This strategy can have the disadvantage of ultimately allocating to a pixel value Ck one of the worst positions Pl in terms of probability. To avoid this situation, the last pairs (Ck, Pl) (for example the last two or three) can be selected by calculating the sum of the probabilities (sum of the coefficients Prb(k,l) of the matrix Prb) of the possible combinations for the selection of the remaining pairs and by choosing the combination of the remaining pairs (Ck, Pl) corresponding to the highest sum of the probabilities (coefficients of the matrix Prb).

The second strategy focuses on the rank or position having the lowest probability, to first select the pixel position or value the most difficult to allocate, so as to prevent a candidate pixel value Ck from being positioned at the position Pl associated with the lowest probability. For this purpose, the following sums are calculated:

$$TC(k)=\Sigma_{l=1}^{8}P_{rb}(k,l) \quad (15)$$

$$TP(l)=\Sigma_{k=1}^{8}P_{rb}(k,l) \quad (16)$$

The lowest sum between TC(k) and TP(l) enables the most critical pixel value Ck or position Pl, and thus a line cl or a column ck of the matrix Prb corresponding to this critical value or position to be identified:

$$ck \text{ is such that } TC(ck)=\text{MIN}_{k=1}^{8}(TC(k)) \quad (17)$$

$$cl \text{ is such that } TP(cl)=\text{MIN}_{l=1}^{8}(TP(l)) \quad (18)$$

in which $\text{MIN}_{k=1}^{8}$ represents the lowest value among the 8 values considered.

The highest coefficient Prb(k,l) of the matrix Prb in this line cl or column ck is then searched for, corresponding to a value-position pair (Ck, Pl) with Ck=Cck or Pl=Pcl, in the following manner:
if TC(ck) TP(cl), the pair chosen is (Cck, Pml), ml being such that:

$$Prb(ck,ml)=\text{MAX}_{l=1}^{8}(Prb(ck,l)) \quad (19)$$

in which $\text{MAX}_{l=1}^{8}$ represents the highest value among the l values considered, and if TC(ck)>TP(cl), the value-position pair chosen is (Cmk, Pcl), mk being such that:

$$Prb(mk,cl)=\text{MAX}_{k=1}^{8}(Prb(k,cl)) \quad (20)$$

The selection of the value-position pair (Cck, Pml) or (Cmk, Pcl) enables the value Cck to be positioned at the position Pml, respectively, the value Cmk at the position Pcl. The same is then done with the remaining values of the sums TC(k) and TP(l), to position the other pixel values Ck at the positions Pl not yet allocated, until all the pixel values Ck are positioned and thus all the pixel positions Pl are allocated.

The example of calculation previously described enables the position of the ordered pixel values P1' to P8' (FIG. 4) of the second group to be determined, from the position and the decompressed value of each of the pixels V1 to V8 of the first group. It can also be considered to send the respective positions of the ordered pixel values P1' to P8' of the second group, and to determine in a similar manner the respective positions of the ordered pixel values V1' to V8' of the first group.

According to one embodiment, each of the intervals defined by the minimum and maximum values of the decompressed values P1a-P8a and V1a-V8a of the pixels of the two groups of pixels P1-P8, V1-V8 are tested. If the interval of one of the two groups is in the interval of the other group, the choice is made to send the positions of the pixels of the group having the broadest interval. In the opposite case, the choice is made to send by default the positions of the pixels of one of the two groups, for example the first group.

It will be understood that the method based on the calculation of the probability matrix Prb that has just been described is also applicable to the case where some of the positions in the original image of the pixel values Ck are known. In this case, only the definition of the intervals associated with the pixel positions to be allocated is adapted to take into account the values of the pixels at known positions in the decompressed image, in accordance with one or other of the definitions previously presented.

More generally, a group of n neighboring pixel values X1 to Xn in an original image, and a corresponding group of n pixels in a final image obtained by applying a process to the original image are considered, the position i of each of the pixels Xi being associated with a rank Rin(i) in the ordered group of the original image. The process provides a final image in which the group of pixels Xi is transformed into a group of pixels Yi in which the pixels Yi can occupy positions conforming to several mathematically equivalent positioning solutions. Thus, each pixel Yi of the group in the final image corresponding to the group Xi in the original image can be associated with a rank Rout(i,j) in the ordered group in the final image for the positioning solution j. According to one embodiment, the aim is to minimize the differences between the ranks Rout(i) of the pixels Yi in the ordered group of pixel values in the final image compared to the ranks Rin(i) of the pixels Xi of the corresponding group in the original image. Thus, a cost function Fj associated with a solution for positioning the pixels Yi is defined, such as:

$$Fj=\Sigma_{k=1}^{n}A(Rin(k))\cdot|Rout(k,j)-Rin(k)|, \quad (21)$$

in which |x| represents the absolute value of the number x, Rout(k,j) is the rank of the pixel Yk according to the solution j, and A(Rin(k)) is a parameter which can be equal to 1 by default or used to give more weight to the preservation of the position of certain pixel values in the group of pixels Xi considered, for example the extreme values of the group. The solution selected for the positioning of the pixels Yi in the final image is the one which corresponds to a minimum value of the cost function Fj. It shall be noted that the solution such that Rout(k,j)=Rin(k) for all the possible values of k, is not always possible. Indeed, this solution corresponds to the case in which the rank of each pixel in the ordered group of the final image corresponds to the original rank of the pixel in the group in the original image. Thus, the cost function Fj is a function for assessing a visual quality criterion of an image, alternative to the one consisting of calculating distances between pixel values and intervals defined using the values of the pixels neighboring a given pixel position.

Furthermore, image processing errors coming from calculation simplifications can be attenuated by changing the position of certain pixels in certain groups of pixels of the processed image. According to one embodiment, simplifications are applied to an image processing, in particular to reduce the duration of the processing, and the aim is to minimize the cost function Fj by an appropriate choice of the positions allocated to the pixels in the processed image.

It will be understood by those skilled in the art that the present disclosure is susceptible of various alternative embodiments and various applications. In particular, the present disclosure does not only apply to image compression or to processes for positioning pixel values, but to any image processing in which the pixels of the image can be positioned at different positions. Indeed, the visual quality criterion based on preserving the rank of the value of a pixel in a group of neighboring pixel values between an original image and a transformed image can extend to processes other than repositioning. Thus, a group of n neighboring pixel values X1 to Xn in an original image is considered, the position i of each of the pixels Xi being associated with a rank Rin(i) in the ordered group of the original image. A process j provides a final image in which the group of pixels Xi is transformed into a group of pixels Yi,j. The different processes j are mathematically equivalent (from the point of view of an accumulative error criterion of SAD or MSE type), but correspond to different error distributions between the different pixels processed. Thus, each pixel value Yi,j of the group can be associated with a rank Rout(i,j) in the ordered group in the final image for the solution j. According to one embodiment, the aim is to minimize the differences between the ranks Rout(i,j) of the pixels Yi,j in the ordered group of pixel values in the final image, and the ranks Rin(i) of the pixels Xi of the corresponding group in the original image. The solution selected j is the one which corresponds to a minimum value of the cost function Fj (equation (21)). Similarly, the cost function Fj can also be defined by a cumulative sum of differences between each processed pixel value and an interval defined from the processed values of the neighboring pixels, in connection with an interval defined in the reference image according to the process previously described.

This criterion more generally applies when image processing operations implement a decomposition of the image into several groups of pixels, each group of pixels undergoing an independent process, before a final recomposition in the final image. Indeed, as neighboring pixels of the original image may be distributed into different groups, the risks of the ranks of the pixels in their original spatial environment being modified upon recomposition may be significant, due to the independence of the processing operations. Isolated artifacts may then appear which can be attenuated by a final filtering process, for example low-pass or median filtering.

According to one embodiment, the visual quality criterion, as defined previously, based either on the ranks Rin and Rout, or on the sum of the differences at the desired intervals, is used to control the intensity of this filtering, this type of filtering having the property of moving a value outside the interval closer to the interval.

The functions and structures of the above-described embodiments may be implemented in any type of suitable electronic circuitry including hardware, firmware, and software, or a combination or subcombination of hardware, firmware, and software. The hardware circuitry may be formed in one or more integrated circuits and may also include circuitry formed from discrete components. The software, and formware, may include executable instructions stored in suitable memory circuitry for execution on suitable processing circuitry, such as a microprocessor, microcontroller, or applications processor.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An image processing method for processing original groups of pixels of an original image to obtain groups of pixels of a final image, each pixel having a pixel value and a pixel position, the method comprising;
   ordering the pixels in each original group monotonically according to the values of the pixels;
   for each possible monotonic ordering of pixels in each original group:
      assigning a value to each pixel according to the position of the pixel in the ordering of pixels to form a corresponding intermediate pixel group;
      determining, for each pixel in the intermediate pixel group, a pixel value difference or a pixel position difference based on the position of the pixel in the intermediate pixel group and the position of the pixel in the original group of pixels from which the value of the pixel is assigned in the intermediate pixel group;
      calculating a cumulative sum of pixel value differences or pixel position differences of the pixels of the intermediate pixel group;
      selecting the intermediate pixel group with the smallest cumulative sum of pixel value differences or the smallest cumulative sum of pixel position differences;
   for each of the original groups of pixels:
      determining a filtering intensity based on the cumulative sum of pixel value differences or the cumulative sum of pixel position differences of the corresponding selected intermediate pixel group; and
      filtering the values of pixels in the corresponding selected intermediate pixel group based on the filtering intensity to provide the corresponding group of pixels for the final image.

2. The method of claim 1, wherein determining, for each pixel in the intermediate pixel group, a pixel value difference comprises:
   defining an interval of values based on values of neighboring pixels of the pixel in the intermediate pixel group; and calculating the pixel value difference based on a relation between the value of the pixel and the defined interval of values.

3. The method of claim 2, wherein defining an interval for a pixel in each intermediate pixel group comprises:

if the value of the pixel in the original group is between a lowest value and a highest value among the values of pixels neighboring the pixel position in the original group, then the interval of values for the pixel is the interval defined by the lowest value and the highest value among the values in the intermediate pixel group corresponding to the neighboring pixels in the original group;

if the value of the pixel in the original group is lower than the lowest value among the values neighboring the pixel position in the original group, then the interval of values for the pixel is the interval defined by the lowest value among the values of the pixels in the intermediate pixel group corresponding to the neighboring pixels in the original group and a value smaller than the lowest value; or if the value of the pixel in the original group is higher than the highest value among the values of the pixels neighboring the pixel position in the original group, then the interval of values for the pixel is the interval defined by the highest value among the values of the pixels in the intermediate pixel group corresponding to the neighboring pixels in the original group and a value greater than the highest value.

4. The method of claim 2, wherein defining an interval for a pixel in each intermediate pixel group comprises:

if the value of the pixel in the original group is between a lower limit chosen equal to the value of a first one of the pixels in the original group neighboring the pixel, and an upper limit chosen equal to the value of a second one of the pixels in the original group neighboring the pixel, the first one of the pixels in the original group neighboring the pixel being the highest value among pixels in the original group neighboring the pixel that is lower than the value of the pixel in the original group, then the interval for the pixel is defined by the values of its two neighboring pixels in the intermediate pixel group corresponding to the first one and the second one of the pixels in the original group.

5. The method of claim 2, wherein the original image comprises several layers, and wherein for each pixel in an intermediate pixel group in a layer selected neighboring pixels of said each pixel in adjacent layers are also included in defining the interval for said each pixel.

6. The method of claim 1, wherein the original image is divided into blocks of pixels, and each block is divided into two groups of pixels in a manner that each pair of two adjacent pixels of the block comprises one pixel of each group, and wherein for each block of pixels the positions of the pixels of only one of the two groups are included in the corresponding intermediate pixel group, and wherein the method further comprises allocating pixel values to the pixels of the other one of the two groups of pixels of the block.

7. The method of claim 6, further comprising:
calculating, for the group of pixels not included the intermediate pixel group, a 2-dimensional probability matrix with the rows corresponding to pixel positions and the columns corresponding to pixel values; and wherein each entry of the matrix is a probability of the corresponding pixel value being at the corresponding pixel position based on the pixel value difference calculated for the pixel.

8. The method of claim 7, further comprising:
selecting the pixel position and the pixel value corresponding to the largest entry of the probability matrix;
allocating the selected pixel value to the selected pixel position; and
repeating the selecting step and the allocating step until all pixel values are allocated.

9. The method of claim 7, further comprising:
(a) calculating a cumulative sum of probabilities for each row and each column of the probability matrix;
(b) determining the row, cl, and the column, ck, of the probability matrix with the smallest cumulative sum of probabilities among all rows and the smallest cumulative sum of probabilities among all columns, respectively;
(c) identifying the largest probability from column ck or row cl of the probability matrix, depending on whether the cumulative sum of probabilities for column ck is less than or equal to that of row cl or not;
(d) allocating the value corresponding to the column of the identified largest probability to the position corresponding to the row of the identified largest probability;
(e) removing the identified row and column of the probability matrix; and
(f) repeating the steps of (b)-(e) on the row and column-removed probability matrix until all values corresponding to the columns of the probability matrix are allocated.

10. The method of claim 6, further comprising selecting the one of the two groups that minimizes a number of generated errors when the pixels of the one of the two groups are included in the corresponding intermediate pixel group.

11. The method of claim 1, further comprising obtaining one or more equivalent positioning solutions for pixels in the intermediate pixel group, wherein each positioning solution is obtained by calculating a difference between a rank of each pixel of the intermediate pixel group and a rank of a corresponding pixel in the corresponding group of pixels of the original image.

12. An image processing circuit comprising compression circuitry configured to process original groups of pixels of an original image to generate groups of pixels in a final image, each pixel having a pixel value and a pixel position, and the compression device configured, for each group of pixels in the original image, to:
order the pixels in each original group monotonically based on the values of the pixels;
for each possible monotonic ordering of pixels in each original group, the compression device configured to:
assign a value to each pixel according to the position of the pixel in the ordering of pixels to form a corresponding intermediate pixel group;
determine, for each pixel in the intermediate pixel group, a pixel value difference or a pixel position difference based on the position of the pixel in the intermediate pixel group and the position of the pixel in the original group of pixels from which the value of the pixel is assigned in the intermediate pixel group;
calculate a cumulative sum of pixel value differences or pixel position differences of the pixels of the intermediate pixel group;

select the intermediate pixel group with the smallest cumulative sum of pixel value differences or the smallest cumulative sum of pixel position differences; and wherein the compression device further includes a filter configured to, for each of the original groups of pixels, determine a filtering intensity based on the cumulative sum of pixel value differences or the cumulative sum of the pixel position differences of the corresponding selected intermediate pixel group; and filter the values of pixels in the corresponding selected intermediate pixel group based on the filtering intensity to provide the corresponding group of pixels for the final image.

13. The image processing circuit of claim 12, further comprising decompression circuitry configured to decompress the final image to generate a decompressed original image corresponding to the original image.

14. The image processing circuit of claim 12, wherein the compression circuitry includes circuitry formed in at least one integrated circuit.

15. The image processing circuit of claim 12, wherein the compression circuitry includes executable instructions and processing circuitry for executing the executable instructions.

16. The image processing circuit of claim 12, wherein the image processing circuit comprises a television.

17. The image processing circuit of claim 12, wherein the compression circuitry is further configured, for each pixel in the intermediate pixel group, to define an interval of values based on values of neighboring pixels of the pixel in the intermediate pixel group, and is further configured to calculate the pixel value difference based on a relation between the value of the pixel and the defined interval of values.

18. The image processing circuit of claim 17, wherein the compression circuitry is further configured to define an initial interval for the pixel based on the values of the neighboring pixels of the pixel in the corresponding original group of pixels.

* * * * *